US012441128B2

(12) United States Patent
Takahashi et al.

(10) Patent No.: US 12,441,128 B2
(45) Date of Patent: Oct. 14, 2025

(54) PRINTING APPARATUS

(71) Applicant: BROTHER KOGYO KABUSHIKI KAISHA, Nagoya (JP)

(72) Inventors: Hiroaki Takahashi, Nagoya (JP); Yasuo Nishikawa, Nagoya (JP); Yoshimitsu Taniguchi, Tajimi (JP); Kosuke Inuzuka, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/450,809

(22) Filed: Aug. 16, 2023

(65) Prior Publication Data

US 2024/0066896 A1 Feb. 29, 2024

(30) Foreign Application Priority Data

Aug. 25, 2022 (JP) ................................ 2022-134528

(51) Int. Cl.

*B41J 11/70* (2006.01)
*B41J 11/66* (2006.01)
*B41J 13/00* (2006.01)
*B41J 13/036* (2006.01)
*B41J 13/08* (2006.01)

(52) U.S. Cl.

CPC ............... *B41J 13/08* (2013.01); *B41J 11/66* (2013.01); *B41J 11/70* (2013.01); *B41J 13/0027* (2013.01); *B41J 13/0045* (2013.01); *B41J 13/036* (2013.01)

(58) Field of Classification Search

CPC ... B41J 13/08; B41J 11/66; B41J 11/70; B41J 13/0027; B41J 13/0045; B41J 13/036
See application file for complete search history.

(56) References Cited

U.S. PATENT DOCUMENTS 6,229,983 B1 * 5/2001 Sawada ................ B41J 11/0045 399/385
2005/0099480 A1 * 5/2005 Saito ...................... B41J 3/4071 347/104

FOREIGN PATENT DOCUMENTS

JP 2008-36991 A 2/2008
JP 2012183729 A * 9/2012 ............. B41J 11/70

* cited by examiner

*Primary Examiner* — Yaovi M Ameh
(74) *Attorney, Agent, or Firm* — KENEALY VAIDYA LLP

(57) ABSTRACT

A printing apparatus includes: a container which accommodates a print medium; a conveyor which has a first conveying route and which conveys the print medium from the container in a conveying direction along the first conveying route; a printing unit which prints an image on the print medium conveyed in the first conveying route; and a dividing unit which performs a dividing processing with respect to the print medium conveyed in the first conveying route. The conveyor is provided with a second conveying route which is branched from the first conveying route at a branching part and in which the print medium having the image printed thereon by the printing unit is conveyed, the printing unit and the dividing unit are positioned above the container; and the dividing unit and the branching part are positioned on an upstream side in the conveying direction with respect to the printing unit.

9 Claims, 9 Drawing Sheets

PRINTING APPARATUS

REFERENCE TO RELATED APPLICATIONS

This application claims priority from Japanese Patent Application No. 2022-134528 filed on Aug. 25, 2022. The entire content of the priority application is incorporated herein by reference.

BACKGROUND ART

There is a publicly known image forming apparatus provided with a cutting mechanism for cutting a sheet (corresponding to a "print medium") which is being conveyed for printing. In the image forming apparatus, a paper feed tray, a cutting mechanism and a recording head are arranged side by side in a horizontal direction.

DESCRIPTION

In the above-described image forming apparatus, there is such a problem that since the paper feed tray, the cutting mechanism and the recording head are arranged side by side in the horizontal direction, the size in the horizontal direction of the image forming apparatus becomes great.

The present disclosure has been made for the purpose of solving the above-described problem; an object of the present disclosure is to make the size of a printing apparatus capable of cutting a print medium to be small and to realize an easy access to a part in the vicinity of a printing unit.

According to an aspect of the present disclosure, there is provided a printing apparatus including: a container configured to accommodate a print medium; a conveyor having a first conveying route and configured to convey the print medium taken out from the container in a conveying direction along the first conveying route; a printing unit configured to print an image on the print medium which is being conveyed in the first conveying route; and a dividing unit configured to perform a dividing processing with respect to the print medium which is being conveyed in the first conveying route, wherein the conveyor is provided with a second conveying route which is branched from the first conveying route at a branching part and in which the print medium having the image printed thereon by the printing unit is conveyed, the printing unit and the dividing unit are positioned above the container; and the dividing unit and the branching part are positioned on an upstream side in the conveying direction with respect to the printing unit.

According to the above-described configuration, it is possible to make the size in the horizontal direction of the apparatus to be small, to realize an easy access to the vicinity of the printing unit, and to improve the maintainability.

In the printing apparatus according to the aspect of the present disclosure, the dividing unit may be a cutting unit configured to cut the print medium.

According to the above-described configuration, even in a case that a marginless printing (borderless printing) is performed, a remaining part of the recording medium is not wasted, and there is no need to provide any countermeasure for dirtiness in the cutting unit.

In the printing apparatus according to the aspect of the present disclosure, a path length, in the first conveying route, between a printing position of the printing unit and a dividing processing position of the dividing unit may be longer than half a length in the conveying direction of the print medium.

According to the above-described configuration, it is possible to suppress a positional deviation of the printing medium due to the load of the dividing processing. As a result, it is possible to suppress any printing misalignment (printing deviation).

The printing apparatus according to the aspect of the present disclosure may further include a controller configured to control the printing unit and the conveyor such that a printing with respect to the print medium is started after completion of the dividing processing with respect to the print medium by the dividing unit.

According to the above-described configuration, it is possible to suppress a positional deviation of the printing medium due to the load of the dividing processing. As a result, it is possible to suppress any printing misalignment.

In the printing apparatus according to the aspect of the present disclosure, the conveyor may be provided with a plurality of roller pairs configured to convey the print medium along the first conveying route, and the dividing unit may be positioned between roller pairs, of the plurality of roller pairs, which are adjacent to each other.

According to the above-described configuration, it is possible to perform the dividing processing stably, thereby improving the precision of the dividing processing. Further, it is possible to prevent any positional deviation of the printing medium due to the load of the dividing processing. As a result, it is possible to suppress any printing misalignment.

The printing apparatus according to the aspect of the present disclosure may further include an end detecting sensor positioned on the upstream side in the conveying direction with respect to the printing unit and configured to detect an end part of the print medium; and the dividing unit may be positioned on the upstream side in the conveying direction with respect to the end detecting sensor.

According to the above-described configuration, it is possible to precisely align a printing area also in the printing with respect to a rear half of the print medium which has been cut.

In the printing apparatus according to the aspect of the present disclosure, the dividing unit may be positioned at a first position at which the dividing unit performs the dividing processing with respect to the print medium in a state that a front end of the print medium is positioned on a downstream side in the conveying direction with respect to the printing unit, or at a second position at which the dividing unit performs the dividing processing with respect to the print medium in a state that the front end of the print medium is positioned on the upstream side in the conveying direction with respect to the printing unit.

According to the above-described configuration, it is possible to lower such a possibility that a user might touch the printing unit while attempting to hold the front end of the print medium at a time that any jam (paper jam) occurs in the dividing unit.

In the printing apparatus according to the aspect of the present disclosure, the conveyor may be provided with a reversing roller pair configured to convey the print medium to the second conveying route, and the dividing unit may be positioned on the upstream side in the conveying direction with respect to the reversing roller pair.

According to the above-described configuration, it is possible to convey a front half of the print medium, which has been cut, stably to the second conveying route.

In the printing apparatus according to the aspect of the present disclosure, the conveyor may be further provided with a plurality of roller pairs configured to convey the print medium along the first conveying route, and at least one roller pair, of the plurality of roller pairs, may be positioned between the printing unit and the dividing unit.

By providing the above-described configuration, even in a case that the print medium is moved in an up-down direction due to the load of the dividing processing, it is possible to prevent the print medium from making contact with the printing unit and to avoid the service life of a printing head from being shortened.

According to the above-described configuration, it is possible to make the size of the apparatus capable of cutting the print medium to be small, and to realize an easy access to the vicinity of the printing unit.

FIRST EMBODIMENT

<Configuration of Printing Apparatus>

Figure 1:
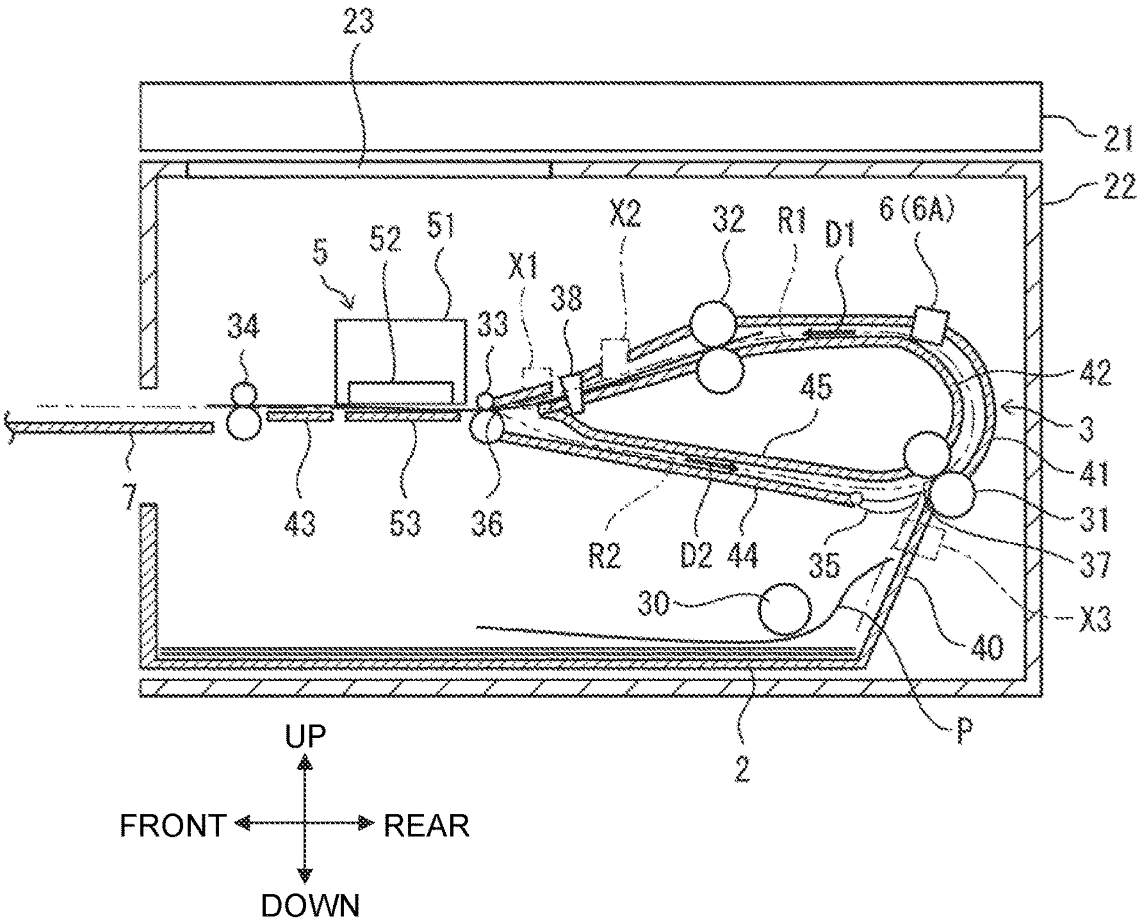
FIG. 1 is a cross-sectional view depicting a configuration of a printing apparatus according to the present disclosure.

In the following, a printing apparatus 1 according to an embodiment of the present disclosure will be explained with reference to FIGS. 1 to 6B. The printing apparatus 1 as depicted in FIG. 1 is a MFP (Multi-Function Peripheral) provided with a plurality of functions including, for example, a print function, a scan function, a copy function, a facsimile function, etc. Note that for the sake of convenience of explanation, the up-down direction and the front-rear direction of the printing apparatus 1 are defined as indicated by arrows in FIG. 1.

The printing apparatus 1 have the print function which is of an ink-jet system wherein, for example, an ink is discharged onto a paper sheet P as a print medium to thereby perform recording of print data specified by a print job on the paper sheet P. The system of printing is not limited to the ink-jet system, and may be an electrophotographic system. Further, the printing apparatus 1 may be capable of performing a color printing, or may be an apparatus dedicated to a monochromatic printing. Furthermore, the paper sheet P is not limited to or restricted by a paper medium, and may be, for example, a resin medium such as an OHP sheet, etc.

As depicted in FIG. 1, the printing apparatus 1 is provided, in a casing 22, with a paper feed tray 2 as a "container", a conveyor 3, a printing unit 5, a cutting unit 6A as an example of a "dividing unit", and a paper discharge tray 7. A scanner unit 21 is mounted on an upper part of the casing 22. The scanner unit 21 is provided to be openable and closable with respect to an upper surface part in the casing 22.

The paper feed tray 2 is a tray configured to accommodate a plurality of pieces of the paper sheet P, and an upper surface of the feed tray 2 is opened. The paper discharge tray 7 is a tray configured to accommodate a paper sheet P discharged from the printing apparatus 1, and an upper surface of the paper discharge tray 7 is opened. The paper feed tray 2 accommodates a paper sheet P of a predetermined size, for example, an A4 size. The printing apparatus 1 may be provided with a plurality of pieces of the paper feed tray 2. The printing apparatus 1 stores a size of the paper sheet P accommodated in the paper feed tray 2 as a setting.

The paper discharge tray 7 is arranged above the paper feed tray 2. Each of the paper feed tray 2 and the paper discharge tray 7 are provided to be detachably installable with respect to the printing apparatus 1, and are installed and detached from a side of a front surface of the printing apparatus 1.

Further, although not depicted in the drawings, an operating part having a displaying screen is provided on the front surface of the printing apparatus 1. The operating part is constructed, for example, of a touch panel and has a configuration wherein a variety of kinds of settings regarding the printing in the printing apparatus 1 and an input of input information are possible by a touch operation of a user.

Note that in the printing apparatus, the front surface, namely, a front side of the apparatus may be a direction in which the paper feed tray is inserted and detached, or a direction in which the paper sheet is discharged to the outside of the apparatus. In the printing apparatus 1 of the present embodiment, the explanation is given provided that the direction in which the paper feed tray 2 is inserted and detached, and the direction in which the paper sheet is discharged to the outside of the apparatus are the same.

Further, the apparatus front side may be a direction in which the operating part operated by the user is arranged. In the printing apparatus 1 of the present embodiment, the explanation is given provided that the direction in which the paper feed tray 2 is inserted and detached, the direction in which the paper sheet is discharged to the outside of the apparatus and the direction in which the operating part is arranged are the same.

The conveyor 3 has a first conveying route R1 indicated by a one-dotted chain line in the drawings, and conveys a paper sheet P taken out from the paper feed tray 2 in a conveying direction indicated by an arrow D1 along the first conveying route R1. Note that the conveying direction is hereinafter simply referred to as the "conveying direction D1". Further, the conveyor 3 is provided with a second conveying route R2 which is indicated by two-dotted chain line in the drawings. The second conveying route R2 is branched from the first conveying route R1. The paper sheet P having the printing performed thereon in the printing unit 5 is conveyed in the second conveying route R2 in a state that the front side and the rear side of the paper sheet P are reversed.

The printing unit 5 prints an image on the paper sheet P which is being conveyed by the conveyor 3 along the first conveying route R1. The cutting unit 6A performs a cutting processing with respect to the paper sheet P which is being conveyed by the conveyor 3 along the first conveying route R1.

Specifically, the conveyor 3 is provided with the first conveying route R1, the second conveying route R2, a paper feeding roller 30, first to fourth conveying roller pairs 31 to 34, a flap 35 and a plurality of guide members 40 to 45.

The paper feeding roller 30 feeds a paper sheet P accommodated in the paper feed tray 2 to the first conveying route R1. The paper feeding roller 30 is driven by a paper feeding motor 17 (see FIG. 3).

The first conveying route R1 is a route which extends upwardly from a rear end part of the paper feed tray 2, is curved and reaches the printing unit 5, passes the printing unit 5 and reaches the paper discharge tray 7. The guides members 40 to 43 are arranged, in the first conveying route R1, each as a guide member guiding the conveyance of the paper sheet P. The guide member 40 extends upward from the rear end part of the paper feed tray 2, and the guide members 41 and 42 are curved and extend from an upper end part of the guide member 40 up to the printing unit 5. The guide member 43 linearly extends from the printing unit 5 up to the paper discharge tray 7.

The second conveying route R2 is a route which is branched from the first conveying route R1 at an upstream side in the conveying direction D1 with respect to the printing unit 5 and which joins to the first conveying route R1 at a location between the guide member 40 and the guide members 41 and 42. In the following, a part at which the second conveying route R2 is branched from the first conveying route R1 is referred to as a branching part 36, and a part at which the second conveying route R2 joins to the first conveying route R1 is referred to as a joining part 37. The guide members 44 and 45 extending from the branching part 36 up to the joining part 37 are arranged in the second conveying route R2.

The flap 35 is provided on the joining part 37. The flap part 35 is closed to thereby construct a part of the second conveying route R2 and to cause the second conveying route R2 to join to the first conveying route R1. In a case that the paper sheet P is conveyed from the second conveying route R2 to the first conveying route R1, the flap 35 is closed, thereby making it possible to convey the paper sheet P from the second conveying route R2 to the first conveying route R1.

The first to fourth conveying roller pairs 31 to 34 are arranged at the first conveying route R1. Each of the first to fourth roller pairs 31 to 34 holds the paper sheet P between rollers constructing each of the first to fourth roller pairs 31 to 34 and conveys the paper sheet P. The first to fourth roller pairs 31 to 34 correspond to a "plurality of roller pairs" which conveys the paper sheet P along the first conveying route R1. The first to fourth roller pairs 31 to 34 are arranged in order from the upstream side toward a downstream side of the conveying direction D1 in the first conveying route R1. In the following, unless specifically noted, the upstream side is the upstream side in the conveying direction D1, and the downstream side is the downstream side in the conveying direction D1.

The first conveying roller pair 31 is arranged in the joining part 37 which is an end part on the upstream side of the guide members 41 and 42. The second conveying roller pair 32 is arranged at an intermediate position of the guide members 41 and 42. The first conveying roller pair 31 and the second conveying roller pair 32 are driven by the paper feeding motor 17 (FIG. 3) which is the same motor driving the paper feeding roller 30.

The third conveying roller pair 33 is arranged on the upstream side in the conveying direction D1 with respect to the printing unit 5 at which end parts on the downstream side of the guide members 41 and 42 are located, and on the downstream side in the conveying direction D1 with respect to the branching part 36. The third conveying roller pair 33 is a roller pair capable of rotating normally and rotating reversely. The third conveying roller pair 33 rotates normally to thereby convey the paper sheet P in the conveying direction D1. The third conveying roller pair 33 rotates reversely to thereby convey the paper sheet P in a direction which is a reverse (opposite) direction of the conveying direction D1 and which is indicated by an arrow D2, and to convey the paper sheet P from the branching part 36 to the second conveying route R2. The third conveying roller pair 33 corresponds to a "reversing roller pair" which conveys the paper sheet P to the second conveying route R2.

It is allowable to provide a flap for closing a part, of the first conveying route R1, which is on the upstream side with respect to the branching part 36 in a case that the paper sheet P is conveyed to the second conveying route R2, although not provided in the example of configuration depicted in FIG. 1.

The fourth conveying roller pair 34 is arranged on the upstream side with respect to the paper discharge tray 7 at which a downstream end of the guide member 43 is located. The fourth conveying roller pair 34 is a roller pair which is capable of rotating normally and rotating reversely. The fourth conveying roller pair 34 rotates normally to thereby convey the paper sheet P in the conveying direction D1 and to discharge the paper sheet P to the paper discharge tray 7. The fourth conveying roller pair 34 corresponds to a "paper discharging roller" which discharges the paper sheet P to the paper discharge tray 7. In a case that the fourth conveying roller pair 34 conveys the paper sheet P to the second conveying route R2, the fourth conveying roller pair 34 is rotated reversely together with the third conveying roller pair 33. The third conveying roller pair 33 and the fourth conveying roller pair 34 are driven by a conveying motor 18 (see FIG. 3).

Note that although the first to fourth conveying roller pairs 31 to 34 are depicted as an example of a plurality of roller pairs which conveys the paper sheet P along the first conveying route R1 in the example of configuration depicted in FIG. 1, the number of the roller pair and position of arrangement of the roller pair are not limited to this.

The printing unit 5 is positioned between the third conveying roller pair 33 and the fourth conveying roller pair 34 in the first conveying route R1. The printing unit 5 records an image on the paper sheet P, namely performs printing on the paper sheet P. The printing unit 5 has a carriage 51, a recording head 52 and a platen 53.

A plurality of nozzles (not depicted in the drawings) is provided on a lower surface of the recording head 52. The recording head 52 discharges droplets of ink (ink droplets) from the plurality of nozzles. An operation of the recording head 52 is controlled by a controller 10 (see FIG. 3). The platen 53 is a member which has a shape of a rectangular plate and on which the paper sheet P is placed. The carriage

51 has the recording head 52 mounted thereon and causes the recording head 52 to move reciprocally in a direction orthogonal to the conveying direction D1. In a process that the carriage 51 moves, the ink droplets are selectively discharged from the recording head 52 with respect to the paper sheet P supported by the platen 53, thereby recording an image on the paper sheet P.

Figure 3:
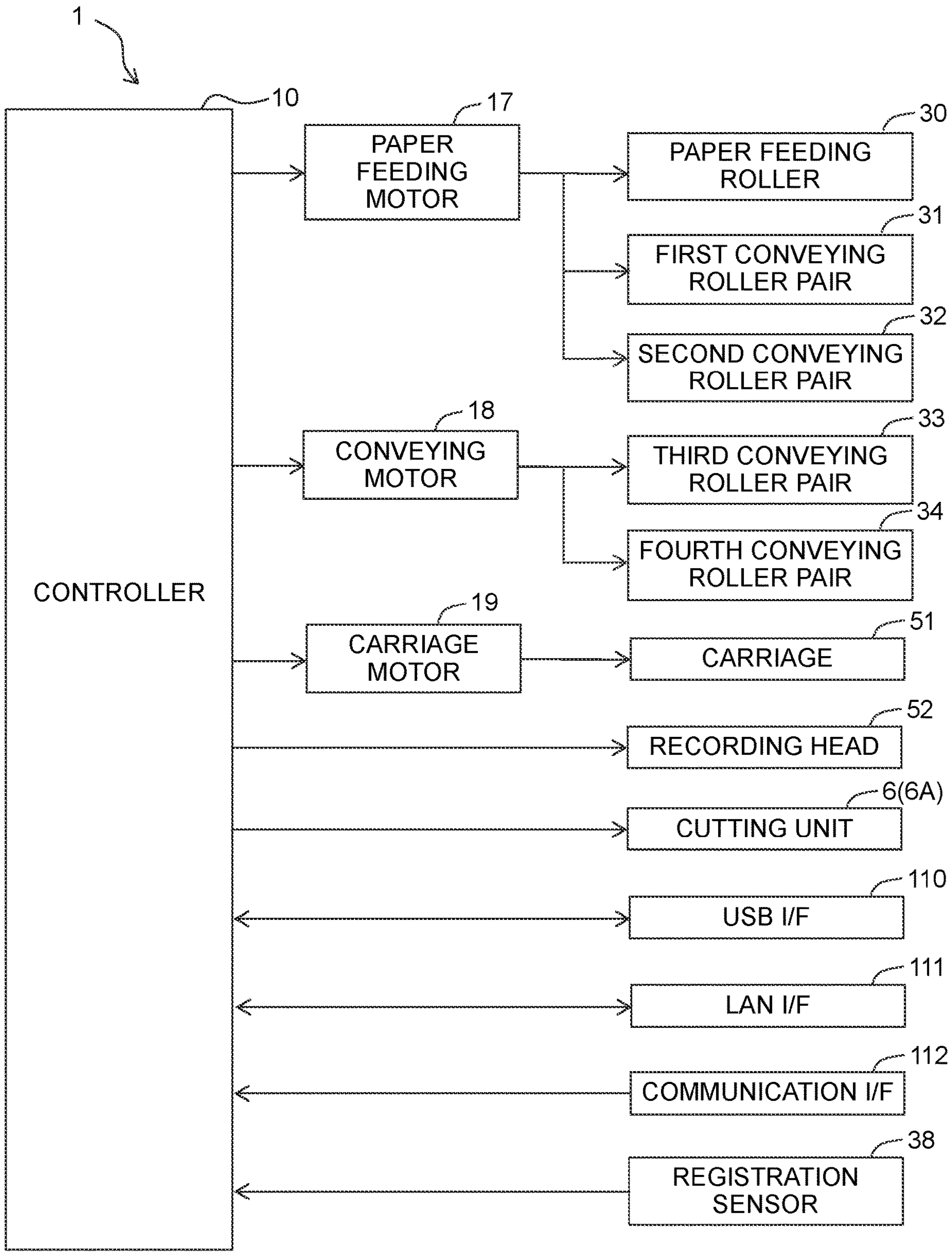
FIG. 3 is a block diagram depicting a configuration of a control system provided on the printing apparatus depicted in FIG. 1.

The carriage 51 is driven by a carriage motor 19 (see FIG. 3). In an image recording on the paper sheet P, the controller 10 repeats a printing processing and a line feeding processing. The recording processing is a processing of discharging the ink droplets from the plurality of nozzles while moving the carriage 51 in a width direction of the paper sheet P in a state that the conveyance of the paper sheet P is stopped to thereby record an image corresponding to one line on the paper sheet P. The line feeding processing is a processing of driving the third conveying roller pair 33 and the fourth conveying roller pair 34 to thereby convey the paper sheet P by a predetermined line feed amount.

The cutting unit 6A is arranged on the upstream side in the first conveying route R1 with respect to the printing unit 5. In the configuration exemplified by FIG. 1, the cutting unit 6A is arranged between the first conveying roller pair 31 and the second conveying roller pair 32 and on the upstream side with respect to a registration sensor 38 (to be described later on).

The cutting unit 6A has a well-known cutter mechanism, and is configured to cut the paper sheet P. Specifically, the cutting unit 6A moves a cutter blade (not depicted in the drawings) in the width direction of the paper sheet P (the direction orthogonal to the conveying direction D1) with respect to the paper sheet P nipped by the first conveying roller pair 31 and the second conveying roller pair 32, thereby cutting the paper sheet P. A position on the paper sheet P at which the paper sheet P is cut is referred to as a dividing position C (see FIG. 2). An operation of the cutting unit 6A is controlled by the controller 10.

Figure 2:
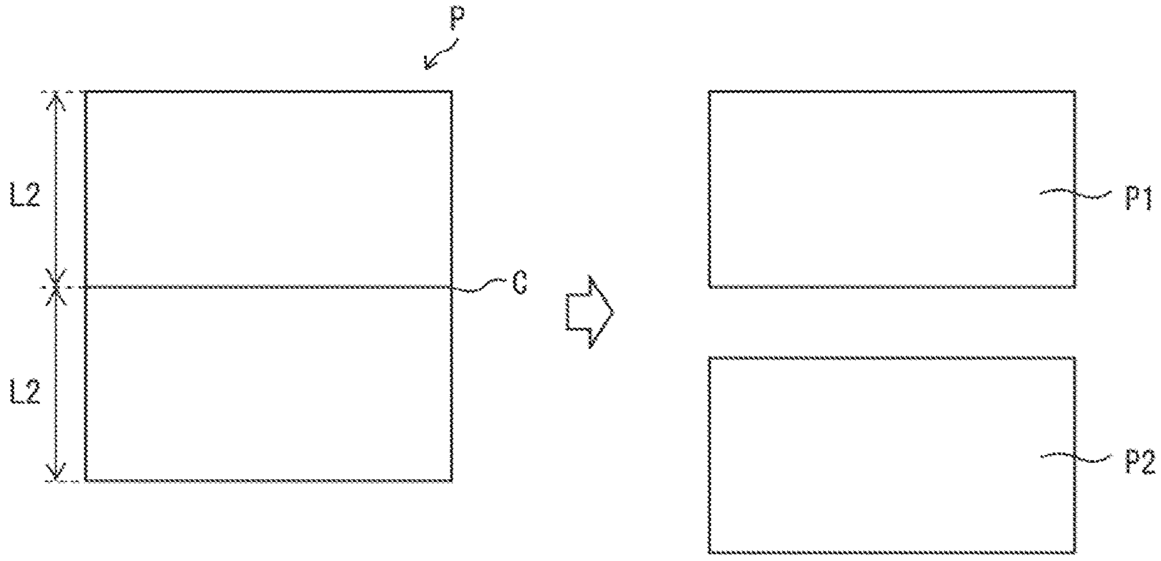
FIG. 2 is a view depicting an example of a cutting processing by a cutting unit of the printing apparatus depicted in FIG. 1.

FIG. 2 is a view depicting an example of the cutting processing by the cutting unit 6A of the printing apparatus 1 depicted in FIG. 1. As depicted in FIG. 2, in a case that the dividing position C is set at a position at half a length in the conveying direction D1 of the paper sheet P from the front end of the paper sheet P, the paper sheet P is cut into a first half-sheet P1 on the downstream side and a latter half-sheet P2 on the upstream side.

In the present embodiment, the cutting unit 6A is installed at a position at which a distance (path length) on the first conveying route R1 from a processing position of the dividing unit 6A up to a printing position (position of the plurality of nozzles) of the recording head 52 becomes shorter than half the length in the conveying direction D1 of the paper sheet P.

As depicted in FIG. 1, the printing unit 5 and the cutting unit 6A are positioned above the paper feed tray 2, and the cutting unit 6A and the branching part 36 are positioned on the upstream side with respect to the printing unit 5.

Further, a registration sensor 38 as an end part detecting sensor for detecting an end part of the paper sheet P which is being conveyed in the first conveying route R1 is provided on the upstream side in the first conveying route R1 with respect to the third conveying roller pair 33, namely, on the upstream side in the first conveying route R1 with respect to the printing unit 5. The registration sensor 38 detects passing of the front end and the rear end of the paper sheet P. In a case that the paper sheet P is cut into the first half-sheet P1 and the latter half-sheet P2 and an image is to be recorded on the first half-sheet P1, the registration sensor 38 detects the passing of the front end and the rear end of the first half-sheet P1. The registration sensor 38 is a sensor required for determining a timing at which the printing is to be started in the printing unit 5 and to record an image on a set position on the paper sheet.

As the registration sensor 38, it is allowable to use a sensor having an actuator which rocks or oscillates by being contacted with the paper sheet P, an optical sensor, etc. The registration sensor 38 outputs an ON signal in a state that the paper sheet P is passing the position of the registration sensor 38, and outputs an OFF signal in a state that the paper sheet P does not pass the position of the registration sensor 38. Namely, the registration sensor 38 outputs the ON signal during a time period since a timing at which the front end of the paper sheet P reaches the position of the registration sensor 38 and until the rear end of the paper sheet P passes the position of the registration sensor 38, and outputs the OFF signal during a time period different from the above-described time period. The detection signal by the registration sensor 38 is outputted to the controller 10.

<Configuration of Control System of Printing Apparatus>

FIG. 3 is a block diagram depicting the configuration of a control system provided on the printing apparatus 1 depicted in FIG. 1. As depicted in FIG. 3, the printing apparatus 1 is provided with the paper feeding motor 17, the conveying motor 18, the carriage motor 19, the controller 10, an USB interface (I/F) 110, a LAN interface (I/F) 111 and a communication interface (I/F) 112, in addition to the respective parts or components as described above.

The controller 10 is constructed, for example, of a micro-computer. The paper feeding motor 17, the conveying motor 18, the carriage motor 19, the recording head 52, the cutting unit 6A and the registration sensor 38 are connected to the controller 10.

The controller 10 controls the operation of each of the paper feeding roller 30 and the first and second conveying roller pairs 31 and 32, via the paper feeding motor 17. Although the paper feeding roller 30 is driven by the paper feeding motor 17 which is same as the motor driving the first and second conveying roller pairs 31 and 32, it is configured such that the transmission of driving from the paper feeding motor 17 to the paper feeding roller 30 is cut in a case that there is no need to feed the paper sheet. It is configured that the transmission of driving from the paper feeding motor 17 to the paper feeding roller 30 can be connected or cut depending on a position of the carriage 51.

The controller 10 controls the operation of each of the third and fourth conveying roller pairs 33 and 34 via the conveying motor 18. The controller 10 controls the operation of the carriage 51 via the carriage motor 19. Although not depicted in the drawings, the controller 10 also controls the operation of the flap 35.

Further, the controller 10 controls the operation of each of the recording head 52 and the cutting unit 6A. In a case that the paper sheet P accommodated in the paper feed tray 2 is, for example, A4-sized, and an image to be printing on the paper sheet P is A5-sized, the controller 10 controls the cutting unit 6A so as to cut the paper sheet P into halves in the conveying direction. With this, the A4-sized paper sheet P becomes to be two paper sheets which are an A5-sized first half-sheet P1 and an A5-sized latter half-sheet P2 (see FIG. 2).

Other than those described above, the USB interface (I/F) 100, the LAN interface (I/F) 111 and the communication interface (I/F) 112 are connected to the controller 10 so as to make the printing apparatus 1 to be a multi-function peripheral.

<Operation of Printing Apparatus>

In a case that the controller 10 receives an instruction to perform recording of an image, the controller 10 drives the paper feeding motor 17 and the conveying motor 18 to thereby rotate the paper feeding roller 30 and the first to fourth conveying roller pairs 31 to 34 normally. With this, one piece of the paper sheet P is fed from the paper feed tray 2, and is conveyed along the first conveying route R1. In a case that the paper sheet P is fed, the driving transmittance to the paper feeding roller 30 is cut until a next paper sheet P is to be fed.

In a case that the registration sensor 38 detects the passing of the front end of the paper sheet P and that the front end of the paper sheet P reaches the third conveying roller pair 33, the controller 10 starts the rotation of the third conveying roller pair 33 while matching the timing with the recording head 52 of the printing unit 5. The controller 10 starts the discharging of the ink from a predetermined position which is determined by a print condition, thereby recording the image on the paper sheet P.

In a case of a single-sided printing, the paper sheet P having the image recorded thereon is conveyed by each of the first to fourth conveying roller pairs 31 to 34 rotating normally, and is discharged to the paper discharge tray 7. In a case that a next printing is to be performed, the controller 10 drives the paper feeding roller 30 so as to feed a next paper sheet P.

In a case of double-sided printing, before the rear end of the paper sheet P having the image recorded thereon passes the third conveying roller pair 33, the controller 10 causes the third and fourth conveying roller pairs 33 and 34 to rotate reversely. With this, the paper sheet P is conveyed to the second conveying route R2 from the rear end thereof. In a case that the rear end of the paper sheet P conveyed to the second conveying route R2 reaches the joining part 37, the paper sheet P is conveyed in the first conveying route R1 by the normal rotations of the first and second conveying roller pairs 31 and 32.

Further, in a case that the front end of the paper sheet P, which has been conveyed in the first conveying route R1 again, reaches a location immediately before (in front of) the third conveying roller pairs 33, the controller 10 returns the rotation of each of the third and fourth conveying roller pairs 33 and 34 to the normal rotation. The paper sheet P is conveyed by the normal rotation of each of the first to fourth conveying roller pairs 31 and 34, after an image is recorded also on the other side of the paper sheet P while the paper sheet P is passing the printing unit 5 for the second time, the paper sheet P is discharged to the paper discharge tray 7. In a case that a next printing is to be performed, the controller 10 drives the paper feeding roller 30 so as to feed a next paper sheet P.

In a case that the controller 10 instructs cutting of the paper sheet P to the cutting unit 6A, the cutting unit 6A performs the cutting processing with respect to the paper sheet P which is conveyed by the normal rotations of the first to fourth conveying roller pairs 31 to 34. In a case that, for example, the dividing position C is a position at which the paper sheet P is cut into halves in the conveying direction D1, the cutting unit 6A cuts the paper sheet P into the first half-sheet P1 and the latter half-sheet P2.

In the following, a transition of the state in a case of cutting the paper sheet P into the first half-sheet P1 and the latter half-sheet P2 by using the cutting unit 6A and of performing the printing thereon will be explained, with reference to FIGS. 4A to 4C, FIGS. 5A to 5C and FIGS. 6A and 6B.

Figure 4A:
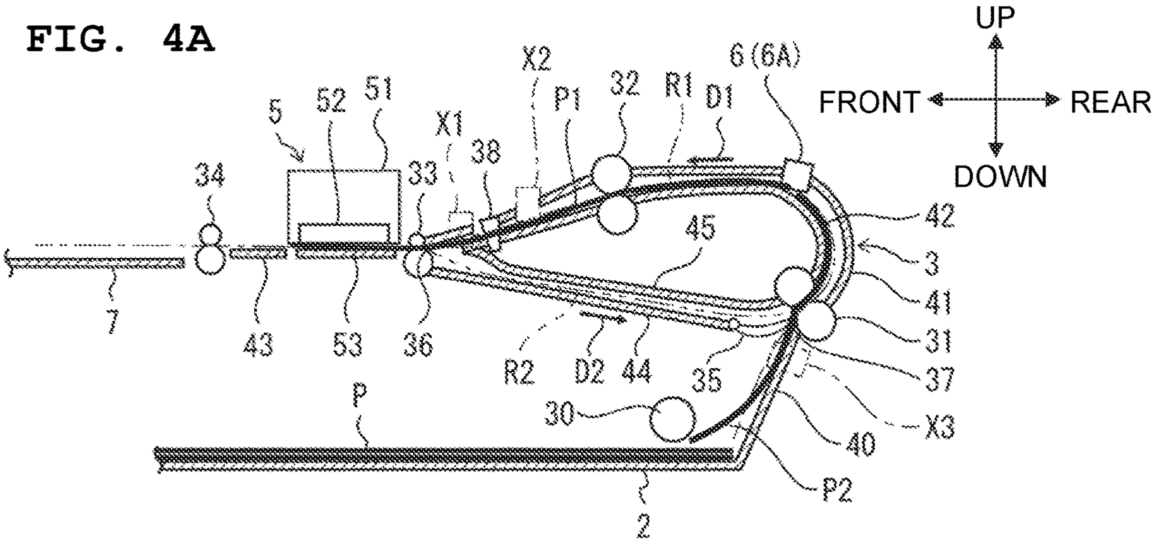
FIGS. 4A to 4C are views explaining a transition of the state in a case of cutting a paper sheet into a first half-sheet and a latter half-sheet, and of performing printing thereon, in the printing apparatus depicted in FIG. 1.

As depicted in FIG. 4A, the controller 10 causes the paper feeding roller 30 and the first to fourth conveying roller pairs 31 to 34 to rotate normally so as to feed the paper sheet P from the paper feed tray 2. Then, the controller 10 conveys the paper sheet P until the dividing position C (see FIG. 2) of the paper sheet P reaches the dividing processing position of the cutting unit 6A and performs the cutting processing. With this, the paper sheet P is divided into the first half-sheet P1 and the latter half-sheet P2.

As described above, in the present embodiment, the cutting unit 6A is arranged at the position at which the distance (path length) on the first conveying route R1 from the processing position of the dividing unit 6A up to the printing position facing the plurality of nozzles of the recording head 52 becomes shorter than half the length in the conveying direction D1 of the paper sheet P. Accordingly, in a case of cutting the paper sheet P, the front end of the first half-sheet P1 reaches the position facing the plurality of nozzles of the recording head 52. Owing to this, the printing with respect to a head (forefront) part of the first half-sheet P1 is also performed.

Figure 4B:
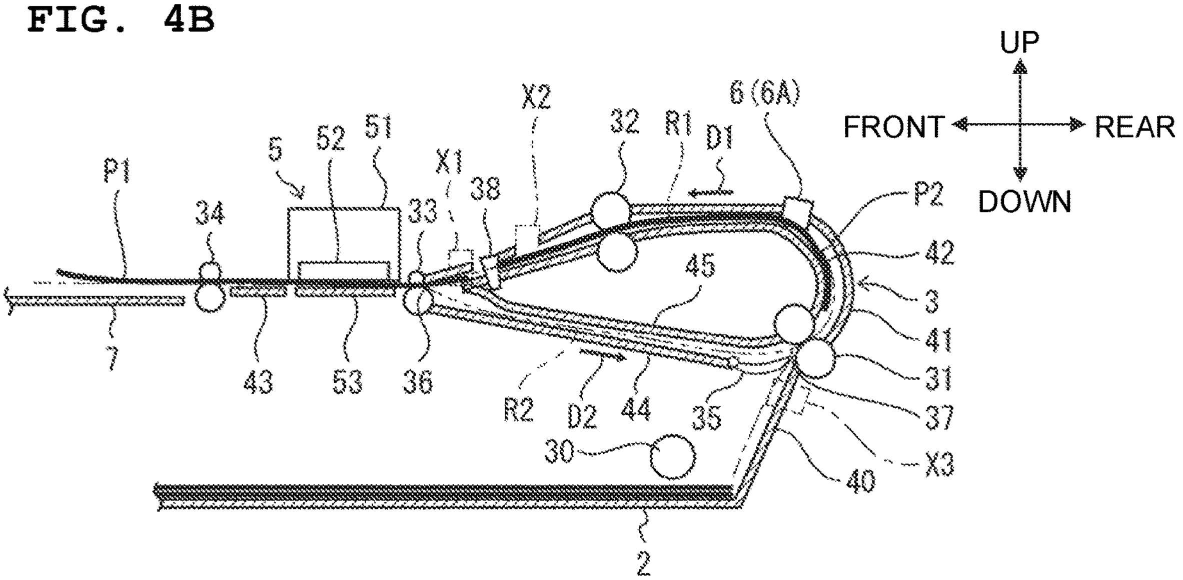

The controller 10 repeats the intermittent conveyance and the printing until the state of FIG. 4A becomes to be the state of FIG. 4B, and the controller 10 performs the printing with respect to a part, of the first half-sheet P1, which is on the rear side of a head part of the first half-sheet P1. In the intermittent conveyance in this situation, all the first to fourth conveying roller pairs 31 to 34 are normally rotated. FIG. 4B indicates a state that a front end of the latter half-paper sheet P2 is between the branching part 36 and the second conveying roller pair 32 and that a rear end of the latter half-paper sheet P2 is located on the downstream side with respect to the first conveying roller pair 31.

Figure 4C:
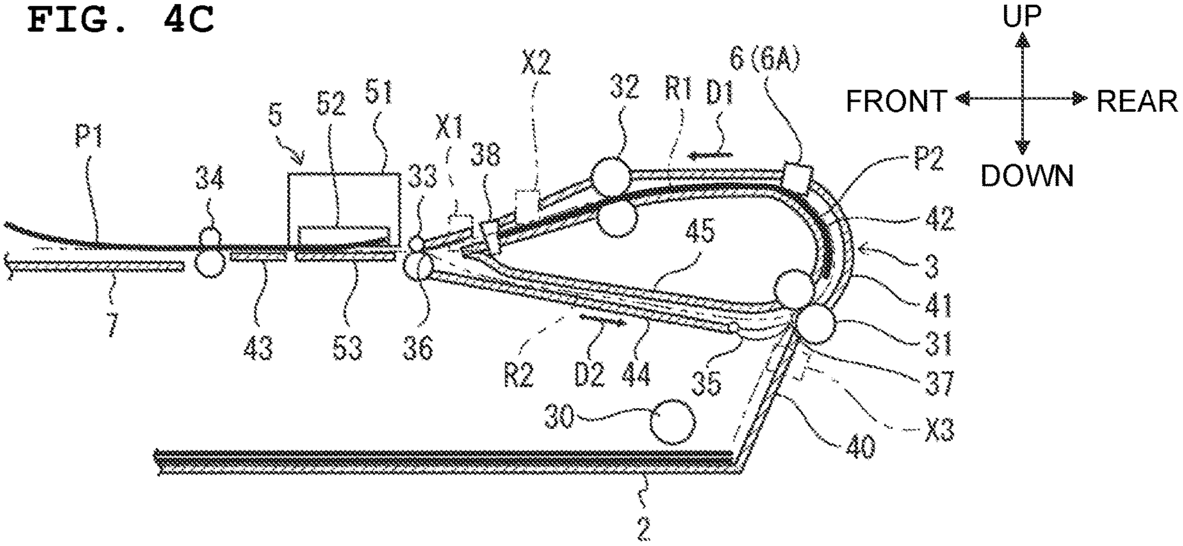

In a case that the state of FIG. 4B is provided, the controller 10 stops the rotations of the first and second conveying roller pairs 31 and 32. With this, the conveyance of the latter half-paper sheet P2 is stopped. In this situation, the printing is not performed with respect to a rear end part of the first half-paper sheet P1. Accordingly, the controller 10 causes only the third and fourth conveying roller pairs 33 and 34 to rotate normally and repeats the intermittent conveyance, thereby completing the printing on a remaining part of the first half-paper sheet P1. FIG. 4C indicates a state that the printing on the first half-paper sheet P1 is completed.

Although not depicted in the drawings, in the case of the single-sided printing, the first half-paper sheet P1 having the image recorded thereon is conveyed by the normal rotations of the third and fourth conveying roller pairs 33 and 34, and is discharged to the paper discharge tray 7. In a case that the next printing is to be performed, the controller 10 resumes the normal rotations of the first to fourth conveying roller pairs 31 to 34, and repeats the intermittent conveyance and the printing. After the controller 10 prints an image also on the latter half-paper sheet P2, the controller 10 causes the latter half-paper sheet P2 to be discharged to the paper discharge tray 7. In a case that further printing is to be performed, the controller 10 drives the paper feeding roller 30 so as to feed a next paper sheet P.

In a case of a double-sided printing, similarly to the case of the single-sided printing, the controller 10 repeats the intermittent conveyance and the printing until the state of FIG. 4A becomes the state of FIG. 4B, and the controller 10 performs the printing on a part, of the first half-sheet P1, which is on the rear side of the head part of the first half-sheet P1. Then, in a case that the state of FIG. 4B is provided, the controller 10 stops the rotations of the first and second conveying roller pairs 31 and 32, and the controller 10 causes only the third and fourth conveying roller pairs 33 and 34 to rotate normally. By repeating the intermittent conveyance of the first half-paper sheet P1, the controller 10 completes the printing on a remaining part of the first half-paper sheet P1, as depicted in FIG. 4C.

Figure 5A:
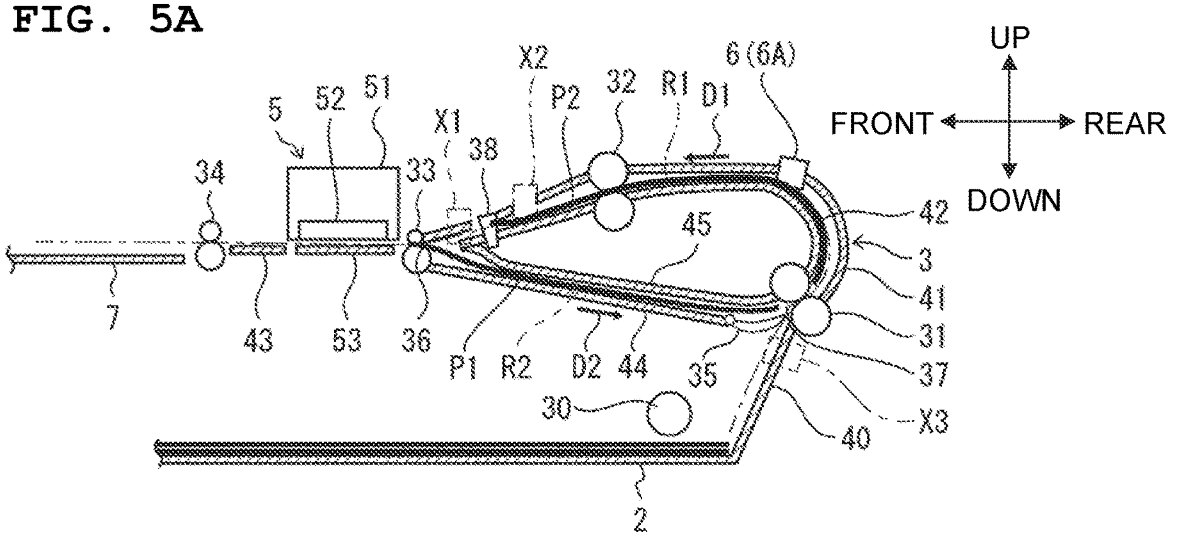
FIGS. 5A to 5C are views explaining the transition of the state in the case of cutting the paper sheet into the first half-sheet and the latter half-sheet, and of performing printing thereon, in the printing apparatus depicted in FIG. 1, and are views depicting the continuation from FIG. 4C.

In the case of the double-sided printing, the controller 10 causes the third and fourth conveying roller pairs 33 and 34 to rotate reversely from the state of FIG. 4C so as to lead or guide the first half-paper sheet P1 having the printing performed on one side thereof to the second conveying route R2. Next, as depicted in FIG. 5A, the controller 10 causes the third and fourth conveying roller pairs 33 and 34 to rotate reversely until a rear end part (a front end part in the conveying direction D2) of the first half-paper sheet P1 reaches a location in the vicinity of the first conveying roller pair 37 which is located at the joining part 37. FIG. 5A depicts a state that the rear end of the first half-paper sheet P1 is in the vicinity of the first conveying roller pair 31. In this situation, the first and second conveying roller pairs 31 and 32 are stopped.

Figure 5B:
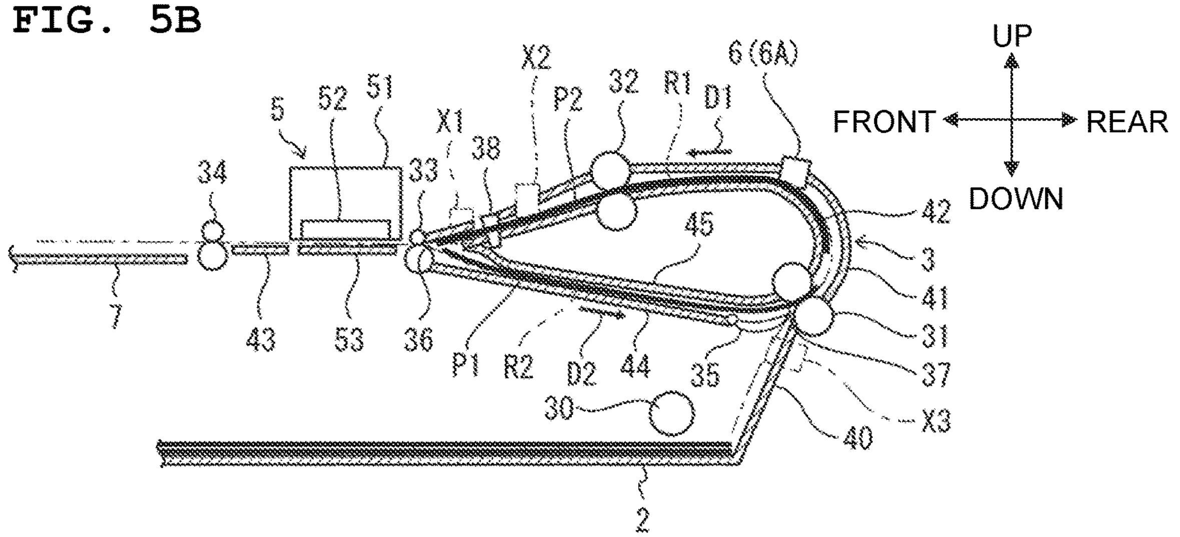

In a case that the first half-paper sheet P1 is conveyed up to the position indicated in FIG. 5A, the controller 10 causes the first and second conveying roller pairs 31 and 32 to rotate normally until the front end (the rear end in the conveying direction D2) of the first half-paper sheet P1 passes the third conveying roller pair 33. In this situation, the third and fourth conveying roller pairs 33 and 34 are maintained to be a state of being rotated reversely. In such a manner, the controller 10 conveys the first half-paper sheet P1 and the latter half-paper sheet P2 until the state depicted in FIG. 5B is provided. FIG. 5B indicates a state that the front end of the first half-paper sheet P1 has passed the third conveying roller pair 33 and immediately before that the front end of the latter half-paper sheet P2 reaches the third conveying roller pair 33. In a case that the first half-paper sheet P1 and the latter half-paper sheet P2 are in the state depicted in FIG. 5B, the controller 10 returns the rotations of the third and fourth conveying roller pairs 33 and 34 to the normal rotations.

Figure 5C:
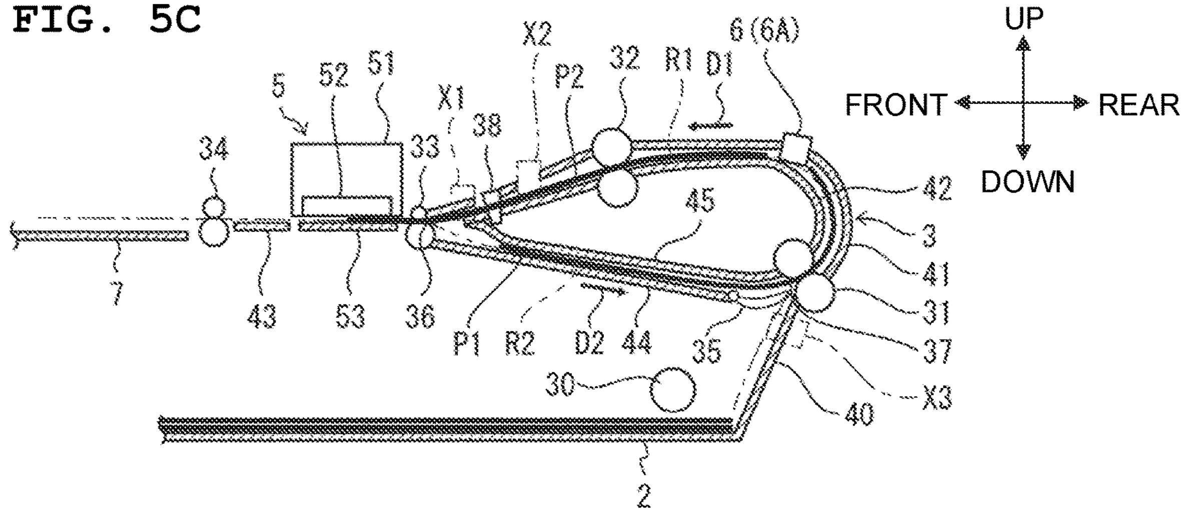
Figure 6A:
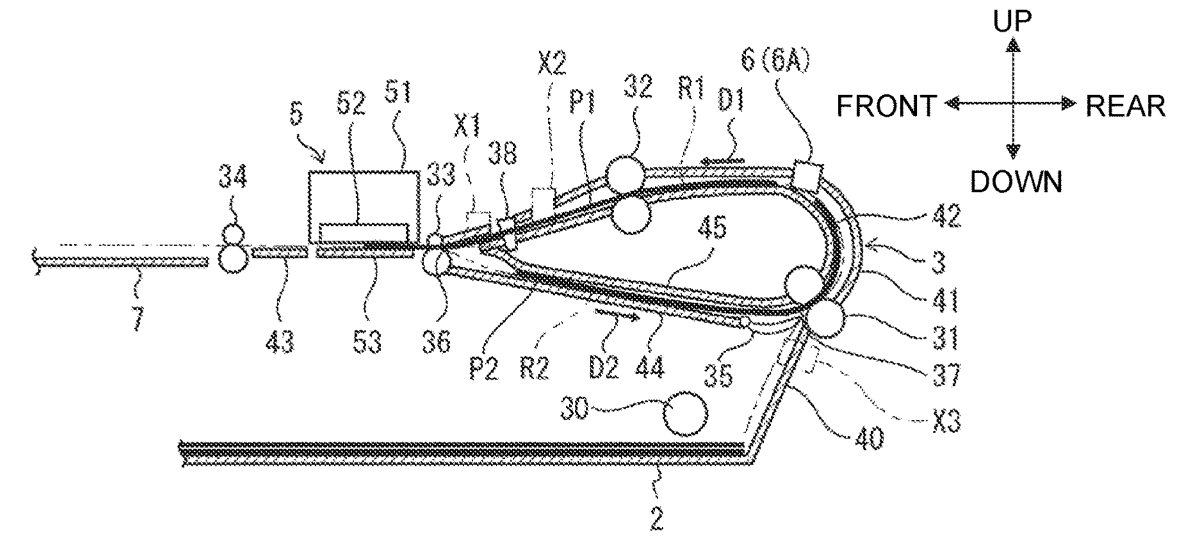
FIGS. 6A and 6B are views explaining the transition of the state in the case of cutting the paper sheet into the first half-sheet and the latter half-sheet, and of performing printing thereon, in the printing apparatus depicted in FIG. 1, and are views depicting the continuation from FIG. 5C.
Figure 6B:
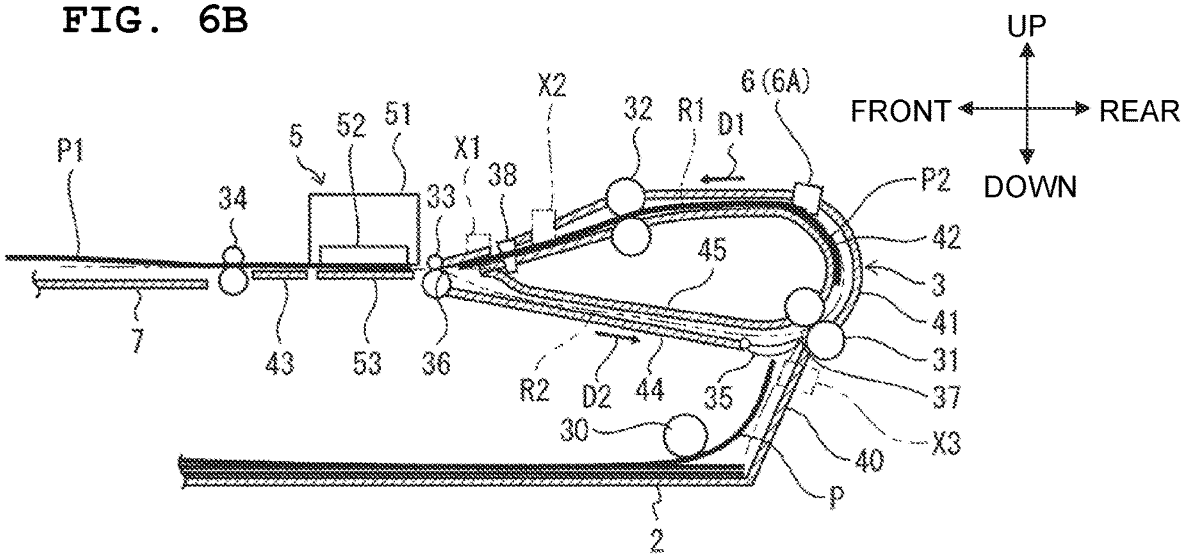

Afterwards, as depicted in FIG. 5C, the controller 10 causes the latter half-paper sheet P2 to be conveyed up to a position at which a front end of the latter half-paper sheet P2 faces the plurality of nozzles of the recording head 25, and performs printing on a head part of the latter half-paper sheet P2. Then, after the controller 10 repeats states similar to the states depicted, respectively, in FIG. 4B to FIG. 5C, the controller 10 uses the second conveying route R2 so as to reverse also the latter half-paper sheet P2, as depicted in FIG. 6A. Then, as depicted in FIG. 6B, in a case that a further printing is to be performed, the controller 10 drives the feeding roller 30, at a timing at which the front end of the latter half-paper sheet P2 has passed the first conveying roller pair 31, so as to feed a next paper sheet P.

<Effect of Printing Apparatus>

In the printing apparatus 1 having the above-described configuration, as depicted in FIG. 1, the printing unit 5 and the cutting unit 6A are positioned above the paper feed tray 2, and the cutting unit 6A and the branching part 36 at which the first conveying route R1 is branched to the second conveying route R2 are positioned on the upstream side in the conveying direction D1 with respect to the printing unit 5.

According to the above-described configuration, since the printing unit 5 and the cutting unit 6A are positioned above the paper feed tray 2, the first conveying route R1 has a part extending from the lower side toward the upper side in the up-down direction. With this, it is possible to make the size in the horizontal direction of the printing apparatus 1 to be small, as compared with a configuration wherein the printing unit 5, the cutting unit 6A and the paper feed tray 2 are arranged side by side in the horizontal direction.

Further, both of the cutting unit 6A and the branching part 36 are positioned on the upstream side in the conveying direction D1 with respect to the printing unit 5. Accordingly, by arranging the cutting unit 6A and the branching part 36 on the rear side of the printing apparatus 1, it is possible to arrange the printing unit 5 more closely to the front side of the printing apparatus 1. With this, it is possible to realize an easy access to the vicinity of the printing unit 5. This makes it possible to easily perform an exchange of the head and/or a processing regarding jam (paper jam) by which a paper sheet P, stopped in the vicinity of the printing unit 5, is to be removed, thereby improving the maintainability. Specifically, the access to the vicinity of the printing unit 5 is performed by opening the scanner unit 21 depicted in FIG. 1 and via an opening 23 defined on a front side of the upper surface of the casing 22.

Figure 10A:
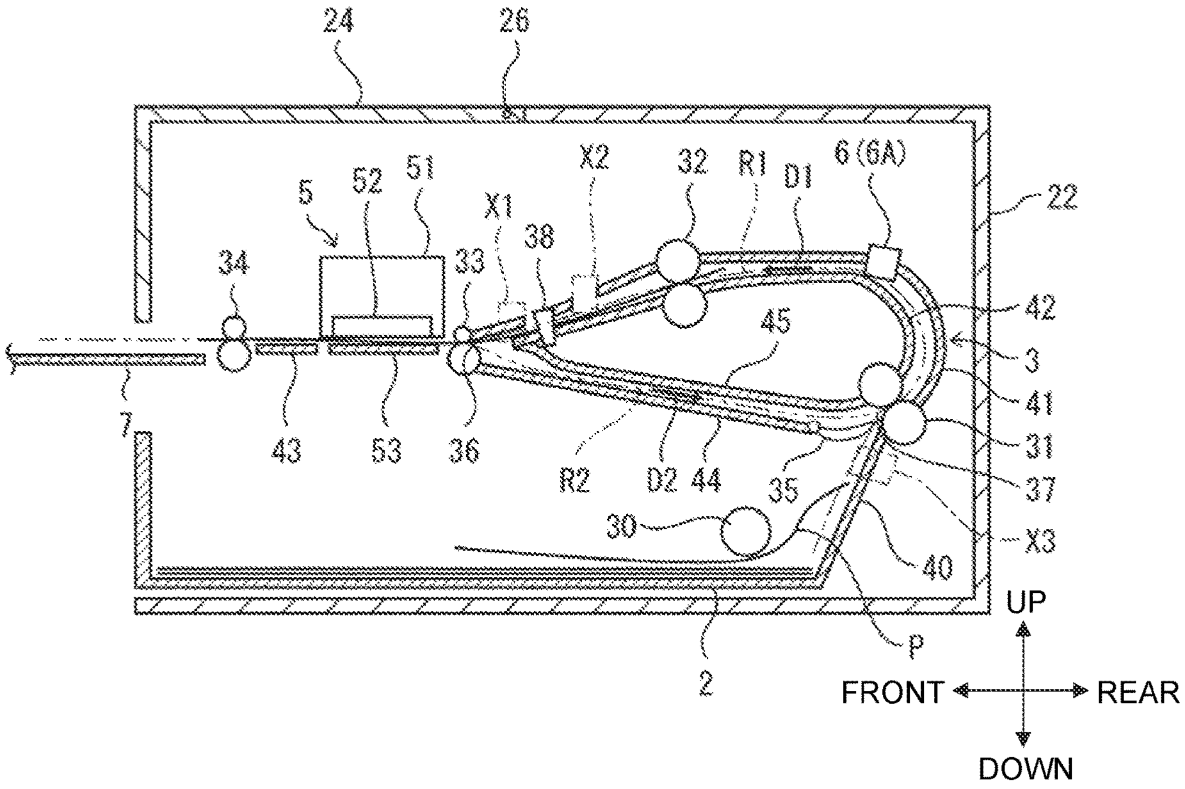
FIGS. 10A and 10B are views each indicating a manner of accessing to an internal part in the printing apparatus.
Figure 10B:
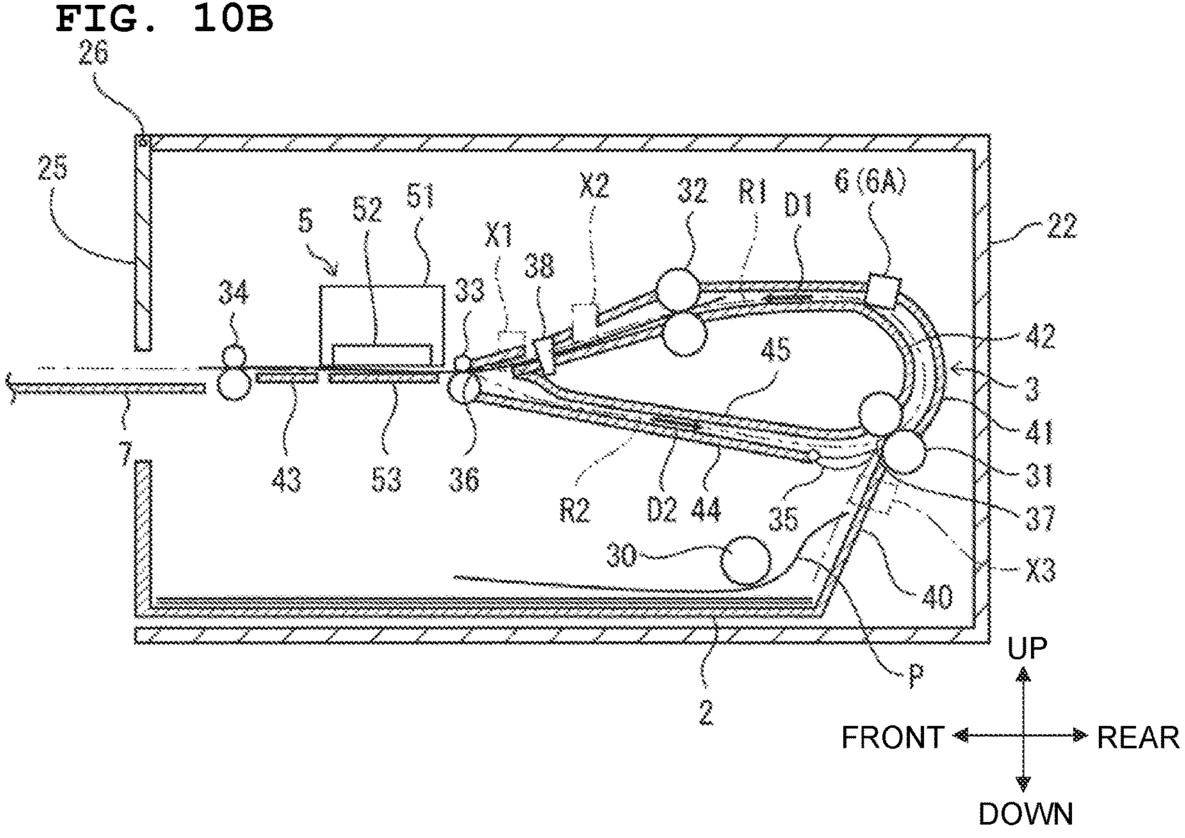

Note that although in the example depicted in FIG. 1, the configuration wherein the scanner unit 21 is opened so as to access to the vicinity of the printing unit 5 via the opening 23 defined on the front side of the upper surface of the casing 22 is indicated as an example, the present disclosure is not limited to or restricted by this. For example, it is allowable to provide such a configuration that an opening is provided so as to include a corner part between the front surface and the upper surface of the casing 22, and that a door 24 having a shape of a letter "L" and configured to close the opening as depicted in FIG. 10A is opened so as to access the vicinity of the printing unit 5. Alternatively, it is allowable to provide such a configuration that the opening is provided on the upper part of the front surface of the casing 22, and a door 25 provided on the front surface and configured to close the opening 23 as depicted in FIG. 10B is opened so as to access the vicinity of the printing unit 5. Note that a reference numeral "26" in FIGS. 10A and 10B denotes a hinge configured to support each of the doors 24 and 25 to be openable and closable.

<Other Remarkable Configuration of Printing Apparatus 1>

Note that in the present embodiment, although the cutting unit 6A is exemplified as the dividing unit 6, the present disclosure is not limited to this. The dividing unit 6 may be, for example, a perforation processing part configured to execute a perforation processing, or a crease processing part configured to execute a crease processing with respect to the dividing position C.

In a case of the perforation processing, the dividing unit 6 may be provided with a perforation cutter in which blades are formed at equal intervals therebetween in a circumference of a disc, instead of the cutter blade of the cutting unit 6A. In a case of the crease processing, the dividing unit 6 may be provided with a round tooth which performs embossing with respect to the paper sheet P to such an extent that the paper sheet P is not cut thereby, instead of the cutter blade of the cutting unit 6A.

In the case that the dividing unit 6 arranged on the upstream side with respect to the printing unit 5 is the cutting unit 6A, it is possible to perform an effective marginless (borderless) printing. In the marginless printing, it is necessary to perform recording of an image so that the image expands from the paper sheet P. Accordingly, in a configuration wherein the paper sheet P is cut after the printing, a remaining part after the printing is wasted. Further, since a part, of the paper sheet, on which the image is printed is cut, there is such a fear that the ink, etc., might be adhered to the cutting unit 6A. According to the above-described configuration, since the paper sheet P is cut before the printing, and thus even in a case that the marginless printing is performed, the remaining part of the paper sheet P is not wasted and there is no need for the countermeasure for any dirtiness in the cutting unit 6A.

In the configuration depicted in FIG. 1, although the dividing unit 6 is arranged between the first conveying roller pair 31 and the second conveying roller pair 32, an arranging position at which the dividing unit 6 is arranged is not limited to this. Examples of the arranging position of the dividing unit 6 are depicted in FIG. 1, with reference numerals X1, X2 and X3. For example, as indicated with the positions X1 and X2, the dividing unit 6 may be arranged between the second conveying roller pair 32 and the third conveying roller pair 33. In this case, the dividing unit 6 may be arranged on the downstream side with respect to the registration sensor 38 as indicated by the position X1, or the dividing unit 6 may be arranged on the upstream side with respect to the registration sensor 38 as indicated by the position X2. Alternatively, the dividing unit 6 may be arranged at a location immediately in front of the first conveying roller pair 31 as indicated by the position X3.

Note, however, that as the arranging position of the dividing unit 6, the position of the dividing unit 6 (cutting unit 6A) as exemplified in FIG. 1, and the positions X1 and X2 are preferred than the position X3 which is immediately in front of the first conveying roller pair 31. Namely, the arranging position of the dividing unit 6 is preferably between the roller pairs.

According to the above-described configuration, since the dividing unit 6 is arranged between the roller pairs such as the first to third conveying roller pairs 31 to 33, it is possible to perform the dividing processing with respect to the paper sheet P in a state of being taut, with the front and rear parts of the paper sheet P being nipped between the roller pairs. This makes it possible to perform the dividing processing stably and to improve the precision of the dividing processing. Further, it is possible to prevent any positional deviation of the printing medium due to the load of the dividing processing and to prevent any occurrence of printing misalignment (printing deviation).

Further, in a case that the diving unit 6 is the cutting unit 6A, the position of the cutting unit 6A is preferably on the upstream side with respect to the registration sensor 38. Namely, in a case that the cutting unit 6A is arranged between the second conveying roller pair 32 and the third conveying roller pair 33, the position of the cutting unit 6A is preferably the position X2 on the upstream side with respect to the registration sensor 38, rather than the position X1 on the downstream side with respect to the registration sensor 38.

In a configuration wherein the cutting unit 6A is positioned between the printing unit 5 and the registration sensor 38, namely a configuration in which the cutting unit 6A is positioned on the downstream side with respect to the registration sensor 38 (position X1), the front end of the latter half-paper sheet P2 which has been cut is located on the downstream side with respect to the registration sensor 38. Accordingly, it is not possible to detect the front end of the latter half-paper sheet P2. As a result, there arises any variation in a print area in the printing with respect to the latter half-paper sheet P2. In contrast, in a case of arranging the cutting unit 6A on the upstream side with respect to the registration sensor 38, it is possible to detect the front end of the latter half-paper sheet P2 with the registration sensor 38. With this, it is possible to align the print area correctly also in the printing with respect to the latter half-paper sheet P2.

Further, in a case that the dividing unit 6 is the cutting unit 6A, it is preferred that the cutting unit 6A is positioned on the upstream side with respect to the third conveying roller pair 33, which corresponding to the reversing roller pair, as the respective positions X1, X2 and X3 of the dividing unit 6 exemplified in FIG. 1.

In a configuration wherein the cutting unit 6A is positioned on the downstream side with respect to the third conveying roller pair 33, in a case of conveying the first half-paper sheet P1, which has been cut, to the second conveying route R2, it is necessary to nip the first half-paper sheet P1 again with the third conveying roller pair 33. The nipping of the first half-paper sheet P1 again is not preferred, since this might cause any variation or fluctuation in the conveyance. According to the above-described configuration, since the nipping, by the third conveying roller pair 33, of the first half-paper sheet P1 which has been cut is maintained, it is possible to convey the first half-paper sheet P1 stably to the second conveying route R2.

Furthermore, the configuration wherein the roller pair is positioned between the printing unit 5 and the dividing unit 6, as the third conveying roller pair 33 exemplified in FIG. 1, is preferred.

In a configuration wherein a roller pair is not present between the printing unit 5 and the dividing unit 6, there is such a fear that the paper sheet P might move in the up-down direction due to the load at the time of the dividing processing by the dividing unit 6 and that the paper sheet P might make contact with the printing unit 5. In a case of the printing unit 5 being the ink-jet system, there is such a fear that the recording head 52 might be scratched or abrased.

According to the above-described configuration, the roller pair, namely the third conveying roller pair 33 in the example of FIG. 1, is present between the printing unit 5 and the dividing unit 6. Accordingly, even in a case that the paper sheet P moves in the up-down direction due to the load at the time of the dividing processing by the dividing unit 6, it is possible to prevent the paper sheet P from making contact with the recording head 52, and prevent any shortening of the service life of the recording head 52.

SECOND EMBODIMENT

Another embodiment of the present disclosure will be explained below. Note that for the sake of convenience of the explanation, a member having a function which is same as that of the member explained in the above-described embodiment is denoted by a same reference numeral, and the explanation thereof will not be repeated.

Figure 7:
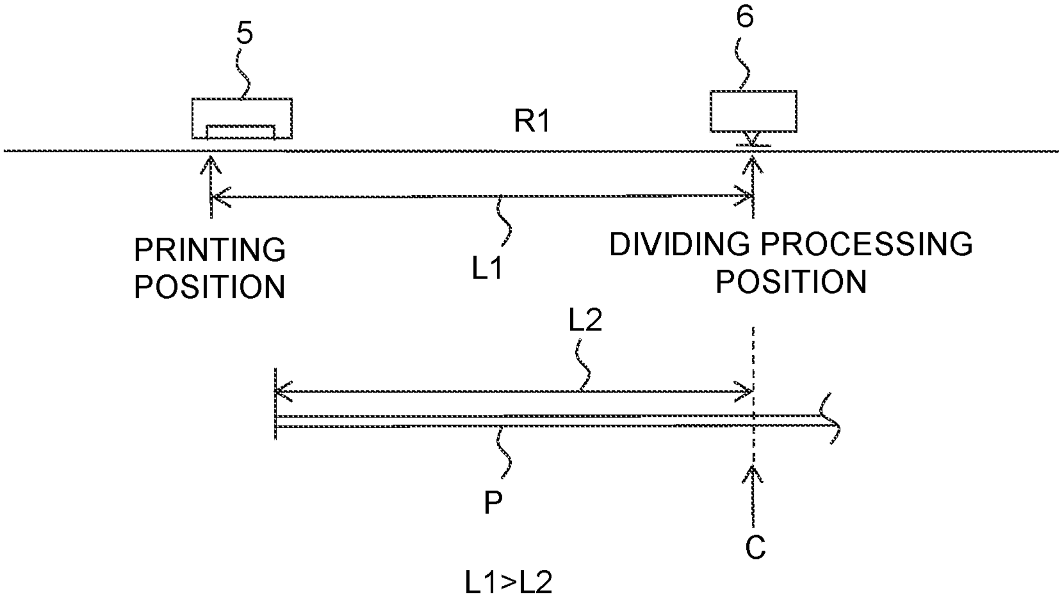
FIG. 7 is an explanatory view of an example of a positional relationship between a dividing processing position of a dividing unit and a printing position of a printing unit in a printing apparatus according to the present disclosure.

FIG. 7 is an explanatory view of a positional relationship between the dividing processing position of the dividing unit 6 and the printing position of the printing unit 5 in a printing apparatus according to this embodiment. As depicted in FIG. 7, the dividing unit 6 is arranged at a position at which a path length L1, in the first conveying route R1, between the printing position of the printing unit 5 and the dividing processing position of the dividing unit 6 becomes longer than a size L2 which is half the length in the conveying direction D1 of the paper sheet P. In a case that the length in the conveying direction D1 of the paper sheet P is, for example, a length of a long side of the A4 size, the size L2 is a length of a short side of the A5 size. In a case of the printing unit 5 being the ink-jet system, the printing position is a position of a nozzle, among the plurality of nozzles, which is located on the downstream-most side.

In a case that the paper sheet P in a state that the printing therefor has been already started in the printing unit 5 is subjected to the dividing processing, there is such a fear that the position of the paper sheet P might be deviated due to the load of the processing, which in turn might lead to any printing misalignment. By arranging the dividing unit 6 at the position at which the path length L1, in the conveying direction D1, from the dividing processing position up to the printing position becomes longer than the size L2, the paper sheet P reaches the printing position after the paper sheet P has been already subjected to the dividing processing. With this, it is possible to prevent the positional deviation of the paper sheet P due to the load of the dividing processing and to prevent any occurrence of printing misalignment (printing deviation).

THIRD EMBODIMENT

Another embodiment of the present disclosure will be explained below. Note that for the sake of convenience of the explanation, a member having a function which is same as that of the member explained in the above-described embodiment is denoted by a same reference numeral, and the explanation thereof will not be repeated.

Figure 8:
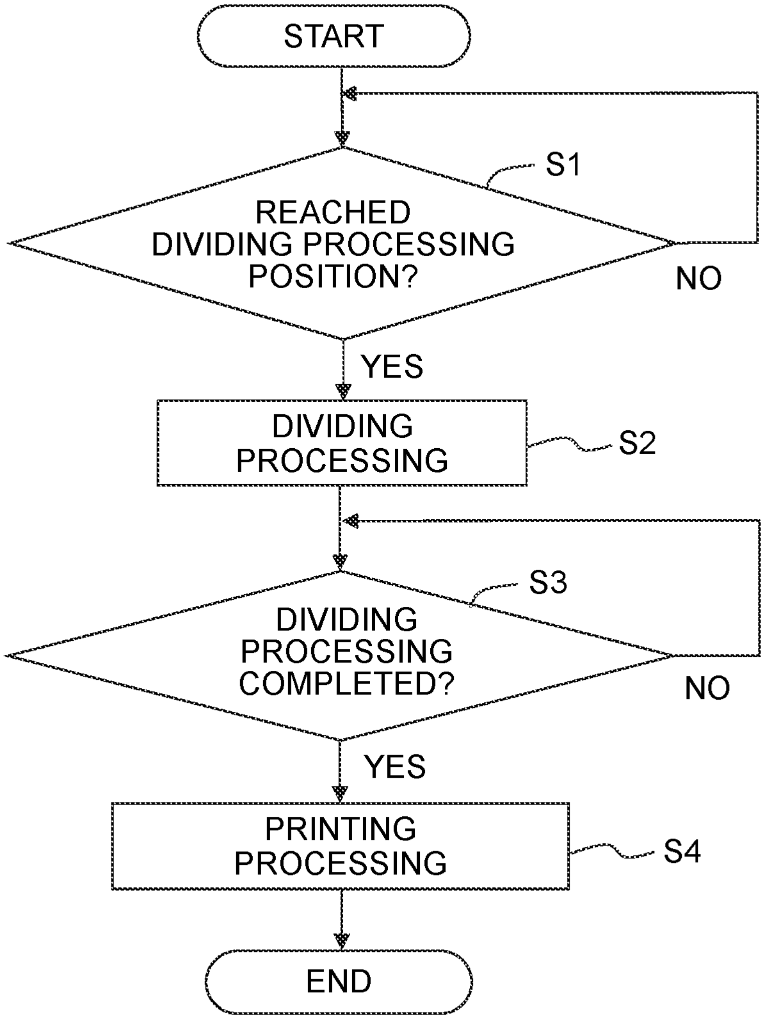
FIG. 8 is a flow chart indicating a part of a control flow performed by a controller in a printing apparatus according to the present disclosure, in a case of performing the dividing processing in the dividing unit.

FIG. 8 is a flow chart indicating a part of a control flow performed by the controller 10 in a printing apparatus according to this embodiment, in a case of performing the dividing processing in the dividing unit 6. As depicted in FIG. 8, in the case of performing the dividing processing in the dividing unit 6, the controller 10 determines as to whether or not the dividing position C of the paper sheet P reaches the dividing processing position of the dividing unit 6 (step S1). In a case that the controller 10 determines that the dividing position C of the paper sheet P reaches the dividing processing position of the dividing unit 6 (step S1: YES), the controller 10 causes the dividing unit 6 to execute a dividing processing (step S2).

Next, the controller 10 determines as to whether or not the dividing processing is completed in the dividing unit 6 (step S3). In a case that the controller 10 determines that the dividing processing is completed in the dividing unit 6 (step S3: YES), the controller 10 causes the printing unit 5 and the conveyor 3 to execute a printing processing (step S4).

As described above, in the printing apparatus of this embodiment, the controller 10 controls the printing unit 5 and the conveyor 3 so that the printing with respect to the paper sheet P is started after the completion of the dividing processing by the dividing unit 6.

In such a manner, the printing with respect to the paper sheet P is started after the dividing processing has been performed with respect to the paper sheet P, by the control of the controller 10. With this, similarly to the printing apparatus of the second embodiment, it is possible to prevent any positional deviation of the paper sheet P due to the load of the dividing processing and to prevent any occurrence of printing misalignment.

FOURTH EMBODIMENT

Another embodiment of the present disclosure will be explained below. Note that for the sake of convenience of the explanation, a member having a function which is same as that of the member explained in the above-described embodiment is denoted by a same reference numeral, and the explanation thereof will not be repeated.

Figure 9A:
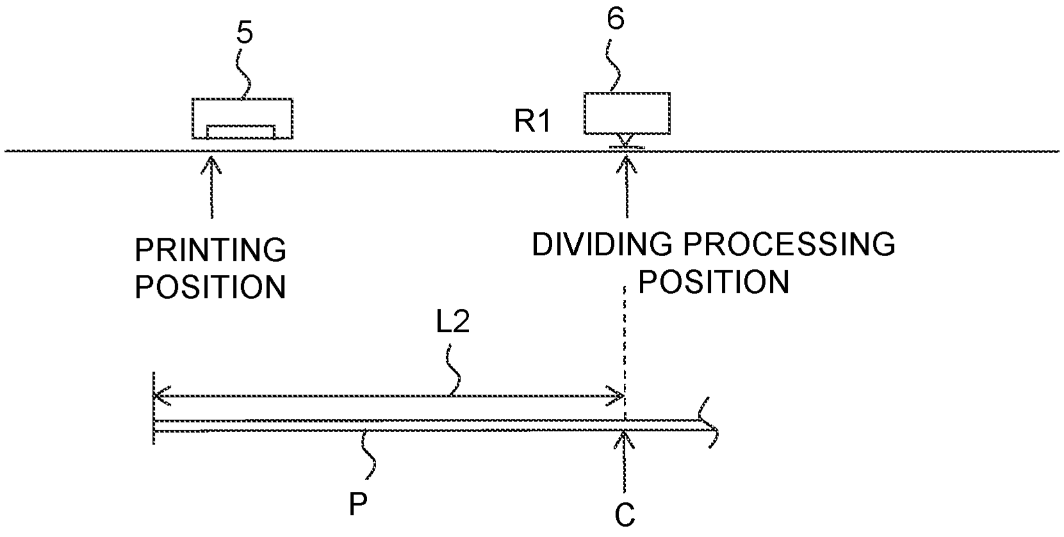
FIGS. 9A and 9B are views each indicating an example of the positional relationship between the dividing unit and the printing unit in a printing apparatus according to the present disclosure.
Figure 9B:
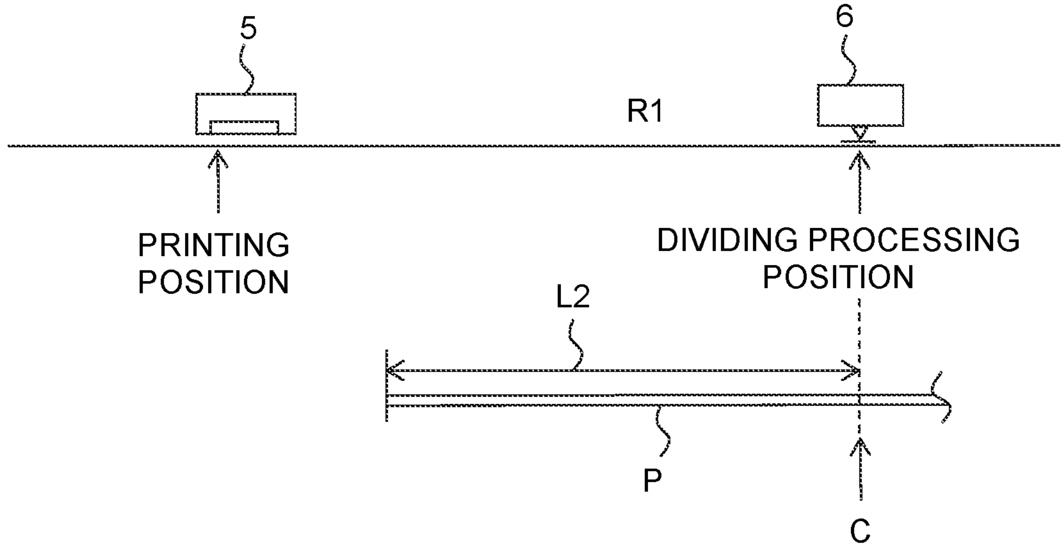

Each of FIGS. 9A and 9B is an explanatory view of a positional relationship between the dividing unit 6 and the printing unit 5 in a printing apparatus according to this embodiment. As depicted in FIG. 9A, the dividing unit 6 is arranged at a position at which the dividing unit 6 performs the dividing processing with respect to the paper sheet P in a state that the front end part of the paper sheet P is located on the downstream side with respect to the printing unit 5. Alternatively, as depicted in FIG. 9B, the dividing unit 6 is arranged at a position at which the dividing unit 6 performs the dividing processing with respect to the paper sheet P in a state that the front end part of the paper sheet P is located on the upstream side with respect to the printing unit 5.

Specifically, in a case of a setting wherein the dividing unit 6 divides the paper sheet P into halves which are the first half-paper sheet P1 and the latter half-paper sheet P2, the position of the dividing unit 6 is following two positions: (1) the dividing unit 6 is arranged at a position at which a path length in the first conveying route R1 from the end part on the downstream side of the printing unit 5 up to the dividing processing position of the dividing unit 6 becomes shorter than the size L2 which is the half the length in the conveying direction D1 of the paper sheet P; (2) the dividing unit 6 is arranged at a position at which a path length in the first conveying route R1 from the end part on the downstream side of the printing unit 5 up to the dividing processing position of the dividing unit 6 becomes longer than the size L2 which is the half the length in the conveying direction D1 of the paper sheet P.

According to the above-described configuration, the front end part of the paper sheet P which is being subjected to the dividing processing in the dividing unit 6 has already passed the printing unit 5, or has not yet entered in the printing unit 5. Accordingly, it is possible to lower such a possibility that a user might touch the printing unit 5 while attempting to hold the front end part of the paper sheet P at a time that any jam (paper jam) occurs in the dividing unit 6.

Further, according to the above-described configuration, it is possible to lower any wasteful consumption of the print medium such as paper sheet, etc. Such an effect also contributes to the achievement of the development goal 12: "ensure sustainable consumption and production patterns" of the Sustainable Development Goals (SDGs) proposed by the United Nations.

[Example of Implementation by Software]

A function of the printing apparatus 1 (hereinafter referred to as an "apparatus") can be realized by a program which is configured to cause a computer to function as the apparatus, and to cause the computer to function as respective control blocks (in particular, respective parts or components included in the controller 10) of the apparatus.

In this case, the apparatus is provided with, as a hardware for executing the program, a computer having at least one controller (for example, a processor) and at least one memory device or a storage device (for example, a memory). The program is executed by the controller and the memory device to thereby realize the respective functions as explained in the above-described embodiments.

The program may be stored in one piece or a plurality of pieces of a non-transitory and computer-readable recording medium. It is allowable that the apparatus is provided with the recording medium, or that the apparatus is not provided with the recording medium. In the latter case, the program may be supplied to the apparatus via any wired or wireless transmission medium.

Further, it is also allowable to realize a part or all of the functions of the respective control blocks by a logical circuit. For example, an integrated circuit in which a logical circuit configured to function as the respective control blocks is formed is also encompassed within the range of the present disclosure. Other than this, for example, it is also possible to realize the functions of the respective control blocks by a quantum computer.

The present disclosure is not limited to each of the embodiments as described above, and various changes can be made within the scope of the claims, an embodiment which is obtained by appropriately combining the technical means each of which is disclosed in one of the different embodiments is also included in the technical scope of the present disclosure.

What is claimed is:

1. A printing apparatus comprising:

a container configured to accommodate a plurality of sheets of print media;

a conveyor having a first conveying route and configured to convey each sheet of the print media taken out from the container in a conveying direction along the first conveying route;

a printing unit configured to print an image on each sheet of the print media which is being conveyed in the first conveying route; and a dividing unit configured to perform a dividing processing with respect to each sheet of the print media which is being conveyed in the first conveying route, wherein the conveyor is provided with a second conveying route which is branched from the first conveying route at a branching part and in which each sheet of the print media having the image printed thereon by the printing unit is conveyed, the printing unit and the dividing unit are positioned above the container, and the dividing unit and the branching part are positioned on an upstream side in the conveying direction with respect to the printing unit.

2. The printing apparatus according to claim 1, wherein the dividing unit is a cutting unit configured to cut each sheet of the print media.

3. The printing apparatus according to claim 1, wherein a path length, in the first conveying route, between a printing position of the printing unit and a dividing processing position of the dividing unit is longer than half a length in the conveying direction of the print media.

4. The printing apparatus according to claim 1, further comprising a controller configured to control the printing unit and the conveyor such that a printing with respect to a sheet of the print media is started after completion of the dividing processing with respect to the sheet of the print media by the dividing unit.

5. The printing apparatus according to claim 1, wherein the conveyor is provided with a plurality of roller pairs configured to convey each sheet of the print media along the first conveying route, and the dividing unit is positioned between roller pairs, of the plurality of roller pairs, which are adjacent to each other.

6. The printing apparatus according to claim 2, further comprising an end detecting sensor positioned on the upstream side in the conveying direction with respect to the printing unit and configured to detect an end part of each sheet of the print media, wherein the dividing unit is positioned on the upstream side in the conveying direction with respect to the end detecting sensor.

7. The printing apparatus according to claim 1, wherein the dividing unit is positioned:

at a first position at which the dividing unit performs the dividing processing with respect to a sheet of the print media in a state that a front end of the sheet of the print media is positioned on a downstream side in the conveying direction with respect to the printing unit, or at a second position at which the dividing unit performs the dividing processing with respect to a further sheet of the print media in a state that the front end of the further sheet of the print media is positioned on the upstream side in the conveying direction with respect to the printing unit.

8. The printing apparatus according to claim 2, wherein the conveyor is further provided with a reversing roller pair configured to convey each sheet of the print media to the second conveying route, and the dividing unit is positioned on the upstream side in the conveying direction with respect to the reversing roller pair.

9. The printing apparatus according to claim 1, wherein the conveyor is provided with a plurality of roller pairs configured to convey each sheet of the print media along the first conveying route, and at least one roller pair, of the plurality of roller pairs, is positioned between the printing unit and the dividing unit.

* * * * *